Nov. 27, 1951 — C. S. GLENNY ET AL — 2,576,111
BICYCLE BASKET
Filed Nov. 21, 1946
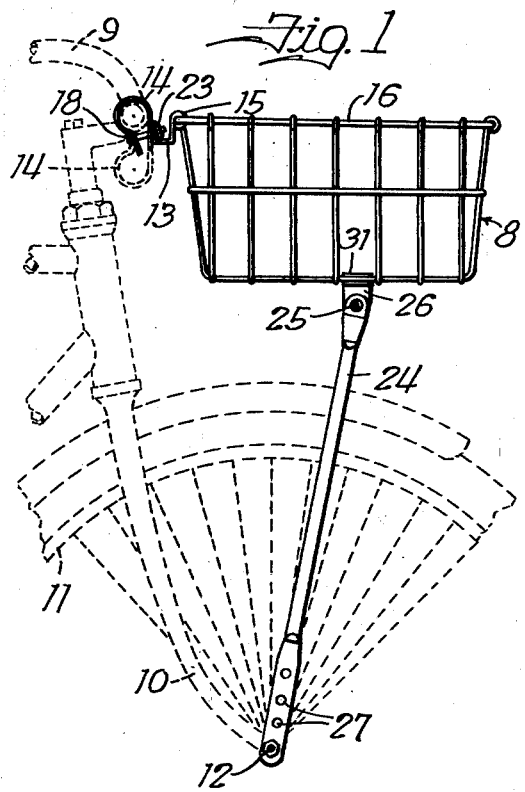
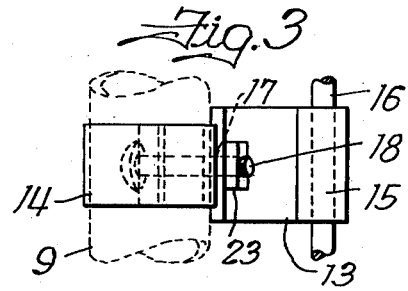
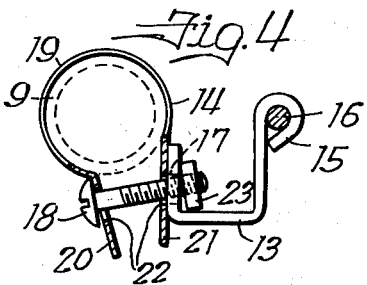
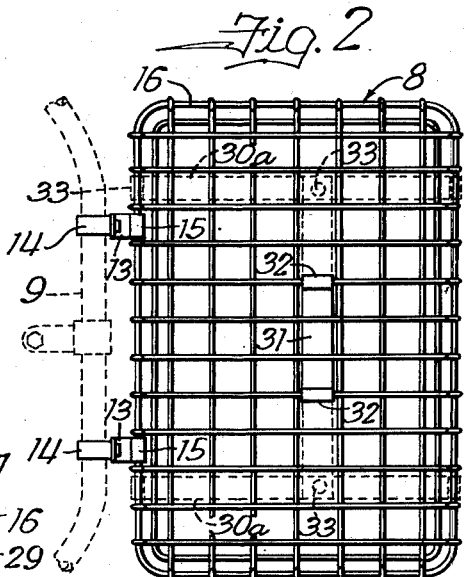
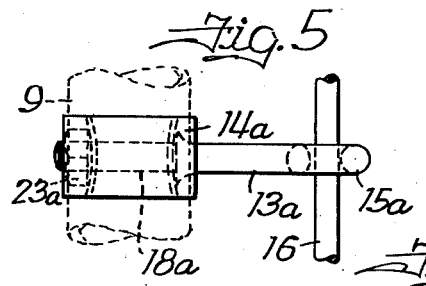
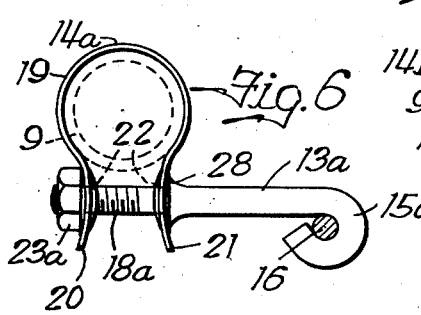
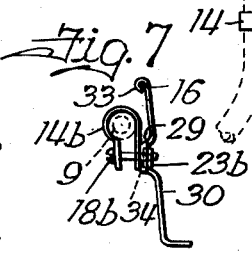
Inventors
Clarence S. Glenny
& Robert C. Method Patented Nov. 27, 1951

2,576,111

UNITED STATES PATENT OFFICE 2,576,111

BICYCLE BASKET

Clarence S. Glenny and Robert C. Method, Rockford, Ill., assignors to The Washburn Company, Worcester, Mass., a corporation of Massachusetts Application November 21, 1946, Serial No. 711,314

7 Claims. (Cl. 224—36)

This invention relates to bicycle baskets and has for its principal object the provision of a basket substantially universally adaptable for application to various makes and styles of bicycles, using attaching means of simple and inexpensive and yet durable construction.

A salient feature of the basket of our invention is the provision of brackets which are pivotally adjustable relative to the back portion of the top frame of the basket to permit change in elevation of the basket with respect to the handle bar, and clamp clips pivoted on the brackets on a transverse axis for angular adjustment in a lateral direction relative to the brackets accordingly as the inclination of the handle bar with respect to the basket may require, the clips being also rotatable through 180° to suit higher or lower elevations of the basket relative to the handle bar.

The flexibility of the clamp clips is enough to compensate for a certain amount of deviation from parallelism of the handle bar with respect to the back of the basket, and, in fact, may even permit their being pivoted directly relative to the back of the basket on sheet metal bands provided on the basket.

The invention is illustrated in the accompanying drawing, in which:

Fig. 1 is a side view of a bicycle basket made in accordance with our invention and shown mounted on the front of a bicycle;

Fig. 2 is a plan view of Fig. 1;

Figs. 3 and 4 are an enlarged plan view and side view, respectively, of one of the handle bar connections shown in Figs. 1 and 2;

Figs. 5 and 6 are similar view showing a modified or alternative construction, and Fig. 7 is a view similar to Fig. 4 showing another modified or alternative construction.

Similar reference numerals are applied to corresponding parts in these views.

Bicycle baskets of the kind to which our invention relates are commonly used for carrying packages on the handle bar. The basket designated generally by the reference numeral 8 is shown supported on the handle bar 9 of a bicycle of which only the front end portion is illustrated in Fig. 1, 10 being the front fork and 11 the front wheel on the axle 12. Our invention is particularly concerned with improved means of attachment of the basket to the handle bar consisting of sheet metal brackets 13 which are of relatively heavy gauge sheet metal construction and fairly rigid, and clamp clips 14 of relatively light gauge spring or mild steel. The brackets 13 are U-shaped and have the upper end of one arm of the U bent to form a tubular portion 15 to receive the back portion of the rectangular wire frame 16 on the top of the basket with a fairly close working fit to allow for pivotal adjustment of the two brackets 13 relative to the basket and thus permit placing the basket 8 at different elevations with respect to the handle bar 9. A hole 17 is punched in the other arm of each of the U-shaped brackets 13 to receive a bolt 18 for pivotally connecting a clip 14 on each bracket for pivotal adjustment on an axis substantially at right angles to the back portion of the frame 16 of the basket accordingly as the inclination of the handle bar relative to the basket may require. The handle bar 9 is, furthermore, not necessarily parallel to the back of the basket 8, as it happens to be shown in Fig. 2, but the loose fit of the bolt 18 in the hole 17 will allow for a certain angularity of the clip 14 relative to the bracket 13 to compensate for the slight deviation from parallelism that is apt to occur with certain shapes of handle bars, and the flexibility of the spring steel used in the clips 14 will also permit the clips to flex to the small extent necessary to compensate for the angularity of the handle bar relative to the basket. The clips 14, which may be termed C-clips are both of circular form through approximately 270°, as indicated at 19 in Fig. 4, and the end portions 20 and 21 through which the bolt 18 is passed have holes 22 provided therein to receive the bolt freely and are normally substantially parallel to one another but arranged to be drawn together by the tightening of the bolt so as to contract the circular portion 19 and thus clamp the handle bar 9 therein, as appears in Fig. 4. A nut 23 is threaded on the end of the bolt 18 on the inner side of the bracket 13, where it is held against turning either by engagement with the inner side of the rear arm of the bracket 13 or with the top of the bottom web portion of the bracket, depending upon the angularity of the bolt 18 with respect to the bracket 13. It should, therefore, be evident from this description that the angular adjustment of the bracket 13 relative to the basket 8 and the angular adjustment of the clip 14 relative to the bracket 13 plus the springiness or flexibility of the clip 14 allows substantially universal application of the basket to all shapes of handle bars regardless of a certain amount of difference in elevation of the basket relative to the handle bar. Obviously the clips 14 may be turned on the bolts 18 through 180° and support the basket at a higher elevation, and when so arranged, they can, of course, be adjusted to suit the inclination of the handle bar and may flex to accommodate rearward inclination of the handle bar relative to the basket. This reversal of the clips 14 is indicated in dotted lines in Fig. 1.

The basket may be supported on the bicycle at the bottom in any suitable way, as for example, by a pair of props 24 pivoted as at 25 at their upper ends to a clevis or bracket 26 provided on the bottom of the basket and attached at their lower ends to the front axle 12, a number of vertically spaced holes 27 being provided in the lower end portion of the props to make allowance for different elevations of the basket with respect to the front axle.

A modified or alternative construction is shown in Figs. 5 and 6 in which an eye-bolt 13a is substituted for bracket 13, having an eye 15a formed on one end for pivotal connection with the wire top frame 16 of the basket, similarly as in Figs. 1–4, and having the other end portion threaded, as shown at 18a, to receive a nut 23a. The threaded end portion extends through the holes 22 in the end portions 20 and 21 of the spring steel clip 14a and there is an annular shoulder provided at 28 next to the threaded portion to form an abutment for the one end portion 21 so that the clip may be tightened by tightening nut 23a to clamp the handle bar 9. Obviously, this construction affords the same universal adjustment as the one first described and is also simple, economical and durable. Obviously the clips 14a may be turned on the threaded portions 18a through 180° and support the basket at a higher elevation, and when so arranged they can, of course, be adjusted to suit the inclination of the handle bar and may flex to accommodate rearward inclination of the handle bar relative to the basket. It is understood that the same or a similar type of bottom support will be provided for the basket, as shown in Figs. 1 and 2.

The construction of Fig. 7 is also similar to that of Figs. 1 to 4 but omits the bracket 13, the clip 14b being pivotally connected directly to a hollow rectangular pad portion 29 embossed from the sheet metal band 30. This is one of a pair commonly provided on bicycle baskets, as indicated, for example, by the dotted line showing at 30a in Fig. 2. The sheet metal plate 31 disposed longitudinally with respect to the bottom of the basket and suitably secured and having its end portions folded over two of the cross wires to provide anchorage for the clevis 26 to which the props 24 are fastened may be extended and connected at its opposite ends, as indicated at 33 to the bands 30a, similarly as disclosed in Dennis Patent 2,010,479. The ends of the bands 30 and 30a are fastened to the top frame 16, as indicated at 33 in Fig. 7, and there are, therefore, fixedly laterally spaced pad portions 29 on the back of the basket for the clamp clips 14b. These pad portions 29 have walls on four sides and are preferably just large enough to house the nuts 23b threaded on the bolts 18b that cooperate with the perforated end portions 20 and 21 of the clips 14b to close the clips tightly on the handle bar 9 when the bolts are tightened, there being, of course, a hole 34 in each of the pad portions 29 to accommodate the bolts 18b. With this construction, it is obvious that the two clips 14b on the back of the basket are free to pivot on substantially horizontal axes defined by the bolts 18b to compensate for the inclination of the handle bar with respect to the basket, and, if the portions of the handle bar onto which the clips 14b are attached are not parallel to the back of the basket, the flexibility or springiness of the spring steel of the clips 14b will permit the clips to accommodate a certain amount of such deviation from parallelism. Obviously the clips 14b may be turned on the bolts 18b through 180° and support the basket at a higher elevation, and when so arranged they can, of course, be adjusted to suit the inclination of the handle bar and may flex to accommodate rearward inclination of the handle bar relative to the basket. This construction therefore affords nearly as wide a range of adjustment, as that disclosed in Figs. 1 to 4 and that disclosed in Figs. 5 and 6, and is obviously simpler and more economical and just as durable as these other constructions. It is understood that the same or a similar type of bottom support will be provided for the basket as shown in Figs. 1 and 2.

It is believed the foregoing description conveys a good understanding of the objects and advantages of our invention. The appended claims have been drawn to cover all legitimate modifications and adaptations.

We claim:

1. In a package carrier for the handle bars of bicycles and the like comprising a receptacle having a horizontal frame, means for rigidly but adjustably supporting and attaching said receptacle on said handle bar comprising supporting brackets pivotally connected on a horizontal axis to said frame for pivotal adjustability of the receptacle up and down in substantial parallelism relative to the handle bar, and handle bar clamp clips tightenable on the handle bar and pivotally connected to said brackets on a substantially horizontal axis in transverse relation to the first mentioned axis and adjustable relative to said brackets to permit attachment to a handle bar disposed in inclined relation to the receptacle, the last mentioned pivotal connections comprising bolts for tightening said clamp clips which when tightened make the adjusted structure rigid.

2. In a package carrier for the handle bars of bicycles and the like comprising a receptacle having a horizontal frame, means for rigidly but adjustably supporting and attaching said receptacle on said handle bar comprising supporting brackets pivotally connected on a horizontal axis to said frame for pivotal adjustability of the receptacle up and down in substantial parallelism relative to the handle bar, and handle bar clamp clips tightenable on the handle bar and pivotally connected to said brackets on a substantially horizontal axis in transverse relation to the first mentioned axis and adjustable relative to said brackets to permit attachment to a handle bar disposed in inclined relation to the receptacle, said clips being pivotally reversible through substantially 180° relative to said brackets so as to project above or below the same to support the receptacle at different elevations relative to the handle bar, the last mentioned pivotal connections comprising bolts for tightening said clamp clips which when tightened make the adjusted structure rigid.

3. In a package carrier for the handle bars for bicycles and the like comprising a receptacle having a horizontal wire top frame, means for rigidly but adjustably supporting and attaching said receptacle on said handle bar comprising U-shaped sheet metal supporting brackets each having the end portion of one arm bent around the back portion of the wire frame for pivotal connection thereto, flexible U-shaped sheet metal clips embracing the handle bar, and bolts extending through holes provided in the spaced arms of the U-shaped clips and through holes provided in the other arm of the U-shaped brackets for tightening the clips on the handle bar and pivotally connecting the clips to the brackets on axes in transverse relation to the pivotal axis of connection of said brackets to said frame, said bolts when tightened to tighten the clips serving to make the entire adjusted structure rigid.

4. In a package carrier for the handle bars for bicycles and the like comprising a receptacle having a horizontal wire top frame, means for rigidly but adjustably supporting and attaching said receptacle on said handle bar comprising U-shaped sheet metal supporting brackets each having the end portion of one arm bent around the back portion of the wire frame for pivotal connection thereto, flexible U-shaped sheet metal clips embracing the handle bar, and bolts extending through holes provided in the spaced arms of the U-shaped clips and through holes provided in the other arm of the U-shaped brackets for tightening the clips on the handle bar and pivotally connecting the clips to the brackets on axes in transverse relation to the pivotal axis of connection of said brackets to said frame, said clips being pivotally reversible on said bolts through substantially 180° relative to said brackets so as to project above or below the same to support the receptacle at different elevations relative to the handle bar, said bolts when tightened to tighten the clips serving to make the entire adjusted structure rigid.

5. In a package carrier for the handle bars of bicycles and the like comprising a receptacle, means for supporting and attaching said receptacle on said handle bar comprising a pair of handle bar clamp clips tightenable on the handle bar, and clip supporting means pivoted on the back portion of the receptacle on a substantially horizontal axis substantially parallel to the handle bar, said clip supporting means having the clips pivotally attached thereto and pivotally adjustable on substantially horizontal axes in transverse relation to the first axis to accommodate different inclinations of the handle bar relative to the receptacle, the last mentioned pivotal connections comprising bolts for tightening said clamp clips which when tightened make the adjusted structure rigid.

6. In a package carrier for the handle bars of bicycles and the like comprising a receptacle, means for supporting and attaching said receptacle on said handle bar comprising a pair of handle bar clamp clips tightenable on the handle bar, and clip supporting means pivoted on the back portion of the receptacle on a substantially horizontal axis substantially parallel to the handle bar, said clip supporting means having the clips pivotally attached thereto and pivotally adjustable on substantially horizontal axes in transverse relation to the first axis to accommodate different inclinations of the handle bar relative to the receptacle, said clips being pivotally reversible through substantially 180° relative to said clip supports so as to project above or below the same so as to support the receptacle at different elevations relative to the handle bar, the last mentioned pivotal connections comprising bolts for tightening said clamp clips which when tightened make the adjusted structure rigid.

7. A carrier for rigid but adjustable application to a cycle having a front wheel fork and a handle bar, said carrier comprising a basket having a bottom, side walls, and front and rear walls, a circumferential frame element on the basket defining the top thereof, said frame element having a straight rear portion extending crosswise in front of the handle bar and of cylindrical form adapted to serve as a hinge pin, a pair of U-shaped supporting brackets, each having one arm of the U bent to form a tubular portion encircling and hinging upon the rear straight portion of the basket frame element permitting up and down adjustment of the basket relative to the handle bar to which said supporting brackets are adapted to be clamped; a pair of one-piece, generally C-shaped handle bar clamp clips attachable to the handle bar, each pivotally connected to the other arm of the associated bracket on an axis in transverse relation to the hinging axis of said U-shaped brackets and spaced radially from the center of the clip for disposition of the clip so that its pivotal axis is at an elevation above or below the handle bar, whereby reversal of the clips upon the handle bar also changes the elevation of the basket independently of the change in elevation obtainable by the hinging adjustment of said U-shaped brackets, the last mentioned pivotal connections comprising bolts for tightening said clips which when tightened make the adjusted structure rigid, and upright means at the lower end of the fork for support of the basket by connection with the bottom thereof.

CLARENCE S. GLENNY.
ROBERT C. METHOD.

REFERENCES CITED

The following references are of record in the file of this patent:

UNITED STATES PATENTS

| Number | Name | Date |
| --- | --- | --- |
| 2,010,479 | Dennis | Aug. 6, 1935 |
| 2,209,846 | Pawsat | July 30, 1940 |
| 2,287,531 | Ong | June 23, 1942 |

FOREIGN PATENTS

| Number | Country | Date |
| --- | --- | --- |
| 175,827 | Great Britain | Mar. 2, 1922 |